May 28, 1935. F. G. BAUM Re. 19,588

HIGH VOLTAGE ELECTRICAL SWITCH

Original Filed July 24, 1923 4 Sheets-Sheet 1

WITNESSES:

C. J. Weller

Ralph H. Swingle

Inventor

Frank G. Baum, deceased by Westinghouse Electric & Manufacturing Company, Assignee

BY

F. W. Seyle,

ATTORNEY

May 28, 1935. F. G. BAUM Re. 19,588

HIGH VOLTAGE ELECTRICAL SWITCH

Original Filed July 24, 1923 4 Sheets-Sheet 2

WITNESSES:

C. J. Weller.

Ralph H. Swingle

Inventor

Frank G. Baum, deceased by Westinghouse Electric & Manufacturing Co. Assignee

BY

F. W. Lyle.

ATTORNEY

May 28, 1935. F. G. BAUM Re. 19,588

HIGH VOLTAGE ELECTRICAL SWITCH

Original Filed July 24, 1928 4 Sheets-Sheet 3

WITNESSES:
C. J. Weller.
Ralph H. Swingle

Inventor
Frank G. Baum, deceased
by Westinghouse Electric & Manufacturing Company, Assignee
BY F. W. Lyle.
ATTORNEY May 28, 1935. F. G. BAUM Re. 19,588

HIGH VOLTAGE ELECTRICAL SWITCH

Original Filed July 24, 1923 4 Sheets-Sheet 4

WITNESSES:
C. J. Weller.
Ralph H. Swingle

Inventor
Frank G. Baum, deceased
by Westinghouse Electric & Manufacturing Company, Assignee
BY
F. W. Lyle.
ATTORNEY Reissued May 28, 1935

Re. 19,588

UNITED STATES PATENT OFFICE 19,588

HIGH VOLTAGE ELECTRICAL SWITCH

Frank G. Baum, deceased, late of San Francisco, Calif., by Westinghouse Electric & Manufacturing Company, East Pittsburgh, Pa., assignee Original No. 1,895,907, dated January 31, 1933, Serial No. 295,007, July 24, 1928. Application for reissue January 17, 1935, Serial No. 2,231

41 Claims. (Cl. 200—150)

This invention relates to electric switches or circuit-breakers for use in high tension lines, and is adaptable either as a single or multiple break switch. In certain respects the invention is applicable to both air and oil switches, and in other respects the improvements are confined to switches of the oil type.

One of the advantages of circuit-breakers embodying this invention is the fact that they are designed to be disposed in alinement and to operate in alinement with that portion of the power line in which they are inserted, thereby making for convenience in installation and effecting a substantial saving in size and space. While switching mechanisms for high tension circuits have been arranged in alinement with the power line, they have been of such a character that the moving parts have been heavy and cumbersome and their operation is seriously hampered by unfavorable weather conditions, especially by snow and ice or sleet.

These disadvantages are overcome by this invention. The moving parts have little inertia and they are protected so as to be unaffected by weather conditions. Both terminals may be moved in the general direction of the line to separate the terminals and break the circuit, and the actuating mechanism for each movable terminal is disposed immediately adjacent the moving part, as a consequence of which the maximum breaking speed is obtained.

Many features of the invention have especial utility with oil switches. Commonly in this type of switch the line terminals enter the oil tank through insulating bushings extending through the top of the tank, and the movable contact member, which is operated from a source outside the tank, bridges the two terminals which extend some distance beyond the inner ends of the bushings to protect the bushings from the arcs. Space must be provided in the tank to allow the bridging contact to be moved away from the terminals the requisite distance, which is considerable with the high voltages employed.

One of the features of the present invention is the fact that while the arcing distance from the bushing is maintained, the terminal itself is withdrawn into the bushing to break contact, and thus a considerable saving in space is effected. The two terminals may be brought in through bushings in opposite ends of the tank and each be movable toward and from the other to make and break the circuit, and this effects a considerable increase of space efficiency not only because both terminals move, but also because they are axially disposed in the tank and therefore greatly reduce the required diameter of the tank.

If desired, the terminals may enter vertically and the bridging contact be used, in which case both the contact and the terminals may move. Also other ways of effecting a multiple break of the circuit in the tank will be described.

This invention also includes improved actuating means for the movable terminals as will later appear. Still other features and advantages of the invention will appear from the following description.

The illustrated embodiments of the invention will now be described and thereafter the invention will be pointed out in claims.

Figs. 6 to 10, inclusive, are diagrams of modified forms of oil switches embodying the invention.

Figure 1:
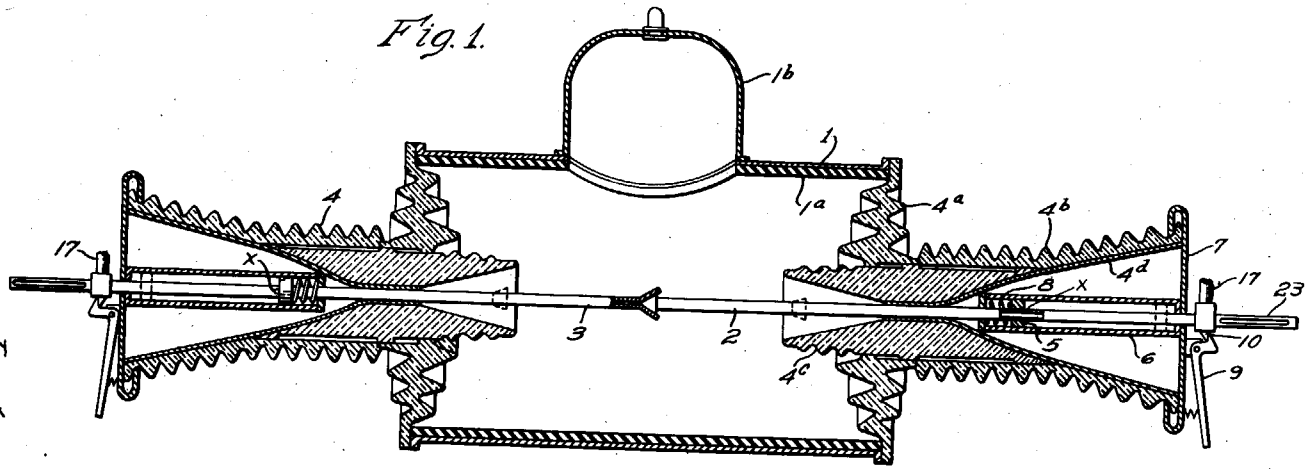
Figure 1 is a longitudinal section in detail of an oil switch embodying the invention.
Figure 3:
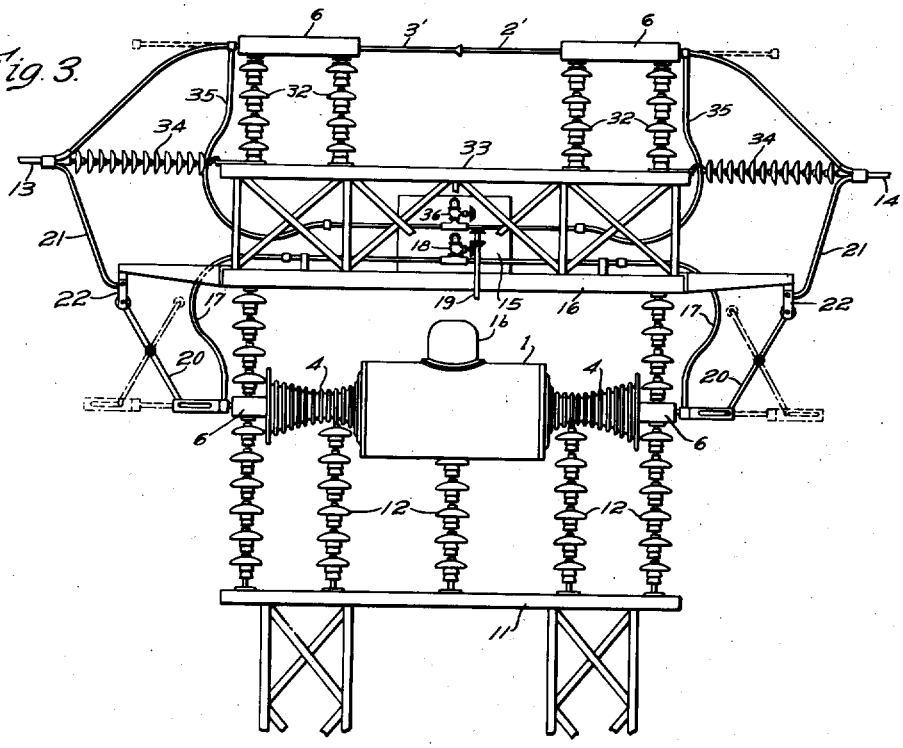
Fig. 3 is an elevation of a switch station construction employing a double disconnecting switch, one an oil switch and one an air switch, and each embodying the invention.

The oil switch construction shown in Figs. 1 and 3 has a cylindrical metal tank 1 with the slidable contact rods 2 and 3 entering through bushings in opposite ends of the tank. On the inner ends of the rods 2 and 3 are cooperative contacts which are adapted to engage when the contacts occupy their inner positions, as shown in Fig. 1, and thus close the line circuit through connections which these contact rods have with the opposite line terminals, as will presently appear. The two bushings 4 are of a similar construction which specifically forms no part of the present invention. They include a head 4a of porcelain or other insulating material, an outer sleeve 4b and an inner sleeve 4c of like material, the two sleeve members having a sheet metal lining 4d, which flares outwardly and provides a conical axial air space. The inner sleeve member 4c extends through the head 4a and the portion of this sleeve within the tank has also a tapered axial bore with its largest diameter at its inner end. Between this tapered bore and the external conical air space of the sleeves there is a restricted axial bearing portion lined by the sheet metal 4d and serving as a bearing for the reciprocating contact rod. The bushing has the usual convolute leakage surface. The tank 1 has a lining 1a of insulating material and is provided with a suitable expansion chamber 1b with a relief valve in its top. The tank is completely filled with oil, and preferably an annular space will be provided between the inner sleeve 4c and the outer members 4a and 4b, which space will be filled with oil to assure of the elimination of any air space in the joints between the members.

The rods 2 and 3 are reciprocated by any suitable actuating mechanism to make and break the circuit. In the construction shown they are connected to a piston 5, which slides in a cylinder 6 disposed axially in the conical air space in the outer part of the bushing. The outer end of the bushing may be closed by a sheet metal head 7 which also serves to support the outer end of the cylinder 6. The piston is actuated by a spring 8 to open the contacts, and is preferably actuated in the opposite direction to compress the spring by fluid pressure means such as compressed air, and if desired, the air may operate the contact rods in both directions. The contact rod extends outwardly beyond the piston 5 for a considerable distance, this outward extension beyond the piston being hollow and being of a sufficient length to extend through the cylinder and outside of the head 7 when the rod is in its inner or contact making position. A latch 9 engages a locking finger 10 on the contact rod outside of the bushing to lock the rod in its contacting position against the tension of the spring 8. Any suitable manually or automatically operated means may be employed to release the latch 9 to allow the contacts to open under the influence of the springs 8. If desired, the contacts may be operated in both directions by air.

While this oil switch is shown in horizontal position it will be understood that it may be disposed in any other position. For example, if the portion of the line in which they are inserted is running vertically, the tank and the sliding contacts may be arranged vertically since the moving parts are not of sufficient weight to be effected by gravity in their movement. Since the springs 8 operate immediately upon the sliding contact rods, the construction is calculated to effect a very quick opening of the contacts when the latch 9 is tripped.

The oil switch is shown in Fig. 3 disposed upon an elevated platform 11 by pillar insulators 12 of suitable insulating capacity. The oil switch is horizontally disposed in line with the power line terminals 13 and 14.

Compressed air is stored in the tank 15, which may be located in any convenient place. In the illustrated station construction of Fig. 3, the tank is supported upon a platform 16 over the oil switch, which platform is also supported by suitable pillar insulators from the platform 11. Air from the tank 15 is employed to actuate the contact rods 2 and 3 to their closed contact position and store energy in the spring 8. A flexible hose member 17 is connected to the outward extension of each contact rod 2 and 3, and each rod is provided with a small port $x$ just back of the piston 5. A two-way valve 18 is operated by any suitable means 19 to admit air from the tank 15 through the hose 17, the hollow rod and the port $x$ to the cylinder 6 behind the piston 5, and this serves to force the piston so as to slide the contact rod to its innermost position until the movable parts are locked by the latch 9.

Figure 4:
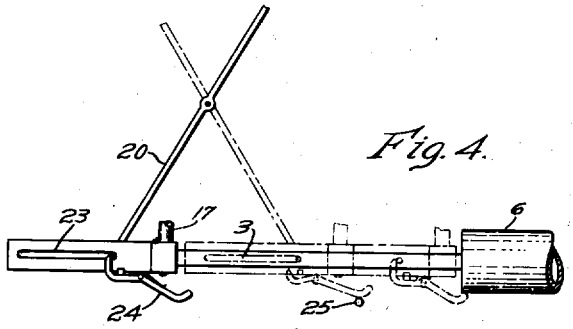
Fig. 4 is a detail of the outside automatic circuit breaker associated with the oil switch construction.

The outer end of each sliding contact rod operates a pivoted contact closer 20 to make and break connection with the power line outside of the oil switch. In the construction shown, the line terminals 13 and 14 are connected by leads 21 to a fixed contact 22. The circuit breakers 20 have a connection with the outer end of the contact rod, as shown in Fig. 4. The outer end of the rod is provided with a longitudinal slot 23, and an angular extension on the lower end of the circuit breaker 20 engages in this slot. In the closed position of the contact controller, which is the position when the contact rod is in its innermost or contacting position, the bottom end of the circuit breaker 20 is in the outer end of the slot 23, as indicated in full line in Fig. 3. This slotted connection assures that the oil switch will open the circuit before the circuit breaker 20 breaks contact with the member 22. In other words, when the latch 9 is tripped, the contact rod slides outwardly under the influence of the spring 8 for a distance equal to the length of the slot 23 before the circuit breaker 20 is caused to open its contact. The continued movement of the contact rod brings the parts into the position shown in dotted lines in Fig. 3 and in full lines in Fig. 4. In this position, a pivoted latch 24 on the lower side of the slotted extension of the contact rod catches back of the angular end of the circuit breaker 20 which rides in the slot 23, as shown in full lines in Fig. 4. This latching is permitted by reason of the fact that the latch is spring-pressed to its latching position and is caused to yield against the tension of the spring by an inclined face on the outer end of the latch over which the end of the circuit breaker rides.

The lower end of the circuit breaker 20 is thus latched to the contact rod with the result that when the contact rod is moved inwardly by the compressed air in the cylinder 6 toward closing position, the lower end of the circuit breaker 20 is carried along with it and the circuit breaker is thus caused to close its contact with the member 22 during the first part of the inward movement of the contact rod. As soon as the circuit is closed, the latch 24 is released by a trip 25 at the point shown in Fig. 4 and thereafter the contact rod continues its inward movement without further movement of the circuit breaker 20, the lower end of which just reaches the outer end of the slot 23 when the contact rod closes the oil switch. In this way, the parts operate to open the circuit in the oil switch before it is opened at the outer point, and to close the circuit at the outer point before it is closed in the oil switch.

Figure 2:
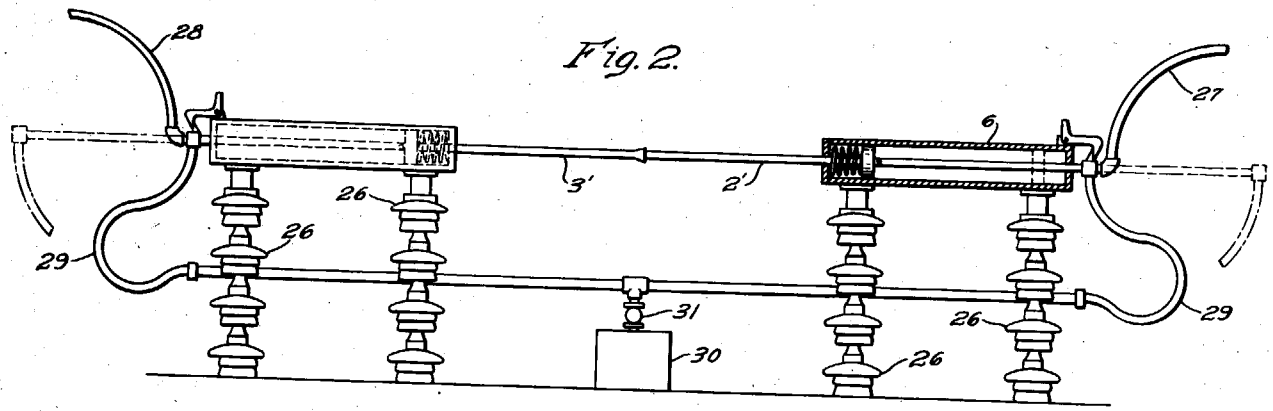
Fig. 2 is an elevation of an air switch construction embodying the invention.

As shown in Fig. 2, the same principles may be employed for an air switch, which is in all substantial respects like the oil switch above described with the omission of the tank and bushings. The two cylinders 6 are supported upon pillar insulators 26. The leads 27 and 28 from the line conductors make connection with the two contact rods 2′ and 3′, and air is supplied to the cylinders 6 for operating the contact rods through flexible hose members 29 from the air tank 30 by means of a two-way valve 31 operated through any suitable operating means (not shown).

In the station arrangement shown in Fig. 3 a bypass for the circuit is provided, as is usual, around the oil switch. As shown, this bypass may consist of an open air switch such as shown in Fig. 2 and above described. The cylinders 6 are supported by pillar insulators 32 upon a platform 33 above the platform 16. The line conductors 13 and 14 are insulated with relation to this platform 26 through dead end insulators 34. Air is supplied to the cylinders 6 for operating the contact rods 2′ and 3′ of the bypass switch through flexible hose members 35 from the tank 15 by means of a two-way valve 36 also operated through suitable operating means 19. Both of the two-way valves 18 and 36 will be vented to the air at the conclusion of each movement to admit air to their respective cylinders.

Figure 5:
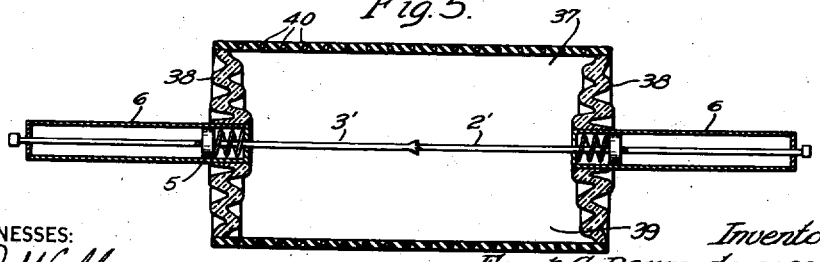
Fig. 5 is a sectional detail of a switch construction embodying the invention having a modified form of enclosure for the contact terminals.

Instead of leaving the bypass switch as an open air switch, the inner ends of the sliding contact rods 2′ and 3′ may be enclosed to protect the moving parts from the weather, and in Fig. 5 there is shown one way in which this may be done. The inner ends of the cylinders 6 are joined by a cylindrical member 37, which in the form shown has convolute heads 38 of porcelain or other insulating material, and a cylindrical body portion 39, which may well be made of a suitable insulating material, strengthened or reinforced by spaced circumferential bands of metal or other strong material. If the body of the cylinder is formed of a composition, the reinforcing bands may be molded within them, as shown, or, if preferred, they may be disposed as hoops around the outer surface of the cylinder. Since they are disposed circumferentially, they will not impair the insulating character of the wall. The heads 38 serve as bushings for the cylinders 6, and if the cylindrical wall be of non-insulating material, a longer bushing will be employed, permissibly of the character shown in the oil switch construction of Fig. 1.

The enclosure of the character shown in Fig. 5 with its body formed of reinforced insulating material specifically forms no part of the present invention, but constitutes the subject matter of the copending application Serial No. 295,008, filed July 24, 1928.

If desired, such an enclosure for the electrical terminals may be filled with oil, in which case the switch becomes an oil switch instead of an air switch.

Figure 6:
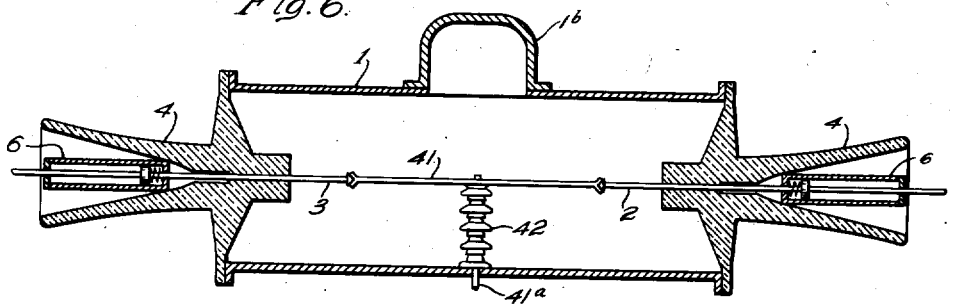
Figure 7:
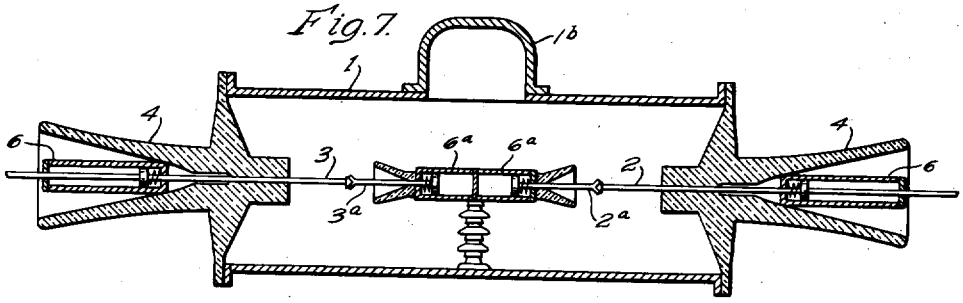
Figure 8:
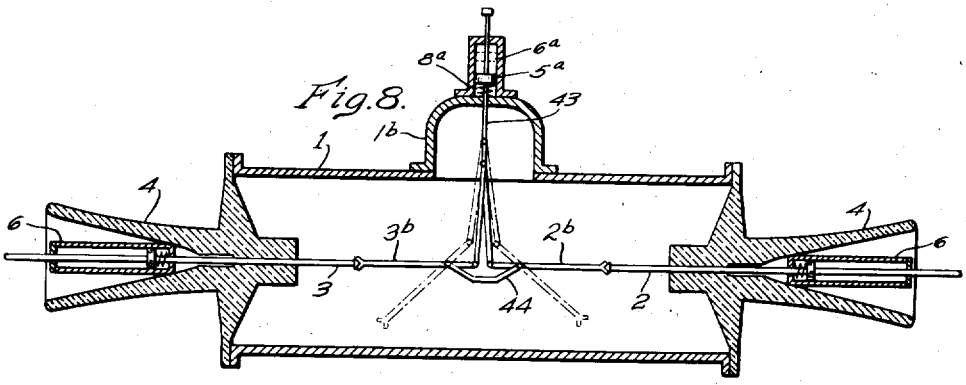

In Figs. 6, 7 and 8, there are shown diagrammatically modified types of horizontal oil switches. In the form shown in Fig. 6, the sliding contact rods 2 and 3 make contact through an intermediate rotary conductive switch member 41. This intermediate rotary switch is pivoted through an insulative support 42 in the bottom of the tank 1 and any suitable means may be employed to rotate the intermediate switch member 41 synchronously with the movement of the sliding contact rods 2 and 3 to open and close the circuit. For example, the pivot rod 41a may be operated through another compressed air cylinder and piston construction (not shown) by means of a bell crank connection, the air being admitted to and exhausted from the cylinder by means of a valve operated in conjunction with the valves that control the admission of air to the cylinders 6 in the bushings 4 for operating the contact rods 2 and 3. A multiple break is thus effected in the circuit and the clearance between the contacts is increased on open circuit position.

Another multiple break arrangement is indicated in Fig. 7 in which the central switch member, instead of being rotative, is composed of two sliding contact rods 2a and 3a operated by pistons in two cylinders 6a arranged in alinement with the cylinders 6 and supported by means of an insulating pillar upon the bottom of the tank 1. Air will be admitted to the cylinders 6a by suitable means (not shown) in synchronism with the admission of air into the cylinders 6. In this way, two pairs of contacts are provided, with both contacts of each pair moving.

Another way of obtaining a double break switch with both contacts of each pair of contacts moving is shown in Fig. 8. Here central contacts 2b and 3b are pivoted upon an insulating support so as to swing vertically. To effect this movement of the intermediate contacts 2b and 3b, they have their inner ends connected through pitmans to a piston rod 43 on a piston 5a sliding in the vertical cylinder 6a and disposed on the top of the expansion chamber 1b of the tank. A spring 8a actuates the piston to open the contacts while air will be admitted through suitable connections (not shown) to close the contacts. The circuit is completed through the contacts by a conductive connection 44 between the pivots of the two swinging contact members 2b and 3b.

Figure 9:
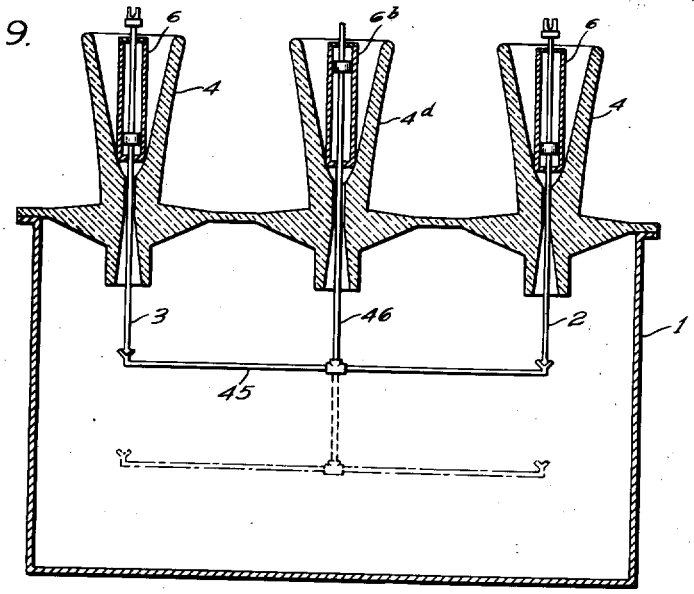
Figure 10:
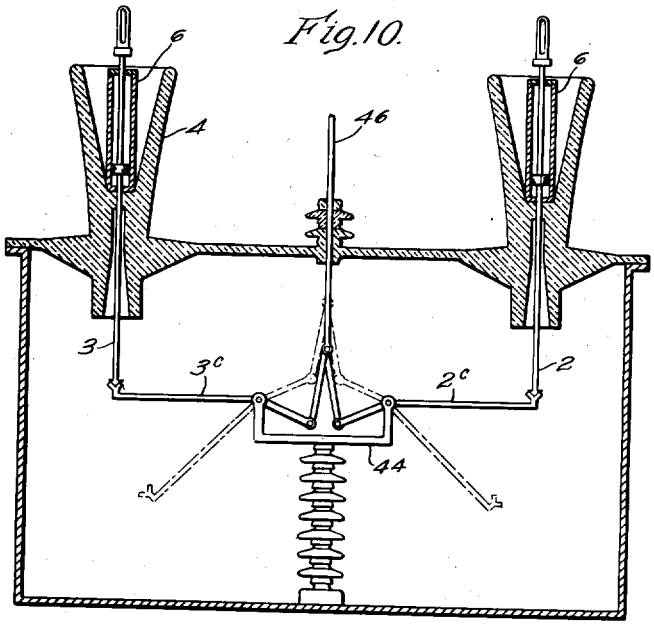

In Figs. 9 and 10 are shown diagrammatically two forms of oil switches with vertically moving contacts and in which a double break is effected and both contacts of each pair move. The two contact rods 2 and 3 slide vertically through the bushings 4 and are operated by the piston and cylinder construction previously described. The bridging contact member 45 is also vertically actuated in opposition to the rods 2 and 3 by means of the reciprocating piston rod 46 whose piston and cylinder are in the insulative bushing 4a and operate as do the other piston and cylinder constructions.

The form shown in Fig. 10 is similar to that of Fig. 9 except that the bridging contact consists of two swinging members 2c and 3c operating similarly to the corresponding members of Fig. 8. These pivoted contact members are actuated through a vertical actuating rod 46 operated by any suitable outside means in synchronism with the actuation of the contact rods 2 and 3.

It is obvious that various modifications may be made in the construction shown in the drawings and above particularly described within the principle and scope of the invention.

What is claimed is:

1. A switching mechanism comprising a pair of alined conductive rods connectable to opposite line terminals and arranged to slide longitudinally through fixed insulating bushings toward and from each other to make and break electrical contact, and actuating means for moving each conductive rod to a point of engagement.

2. A switching mechanism comprising a pair of alined conductive rods connectable to opposite line terminals and arranged to slide longitudinally toward and from each other to make and break electrical contact, actuating means for each rod including a cylinder and a piston and a fixed insulating support for each cylinder.

3. A switching mechanism comprising a pair of alined conductive rods connectable to opposite line terminals and arranged to slide longitudinally toward and from each other to make and break electrical contact, actuating means for each rod including a cylinder and a piston and a fixed insulating bushing surrounding and supporting each cylinder.

4. A switching mechanism comprising a pair of movable contacts, a longitudinally slidable rod for operating each contact, means for actuating and guiding each rod to cause the same to open and close said contacts, and a rigidly mounted insulating support for each of said means.

5. A switching mechanism comprising an insulated oil-containing tank supported in proximate relation to the line terminals and having its opposite ends formed of insulating material, two alined rods connectable to the line terminals and slidable in the ends of the tank and arranged to make contact within the tank, and means on the respective ends of the tank to reciprocate the respective rods to make and break the line circuit.

6. A switching mechanism comprising an insulated, oil-containing tank supported in proximate relation to the line terminals with its axis horizontal, two rods slidable axially in the opposite ends of the tank and connectable to the opposing line terminals and arranged to make contact within the tank, means including a cylinder and piston for reciprocating each rod to make and break the line circuit, and insulating means for supporting the cylinders upon the respective ends of the tank.

7. For a power line, a switching mechanism comprising an oil-containing tank arranged with its axis parallel to the power line, an insulating bushing axially disposed in each end of the tank, a contact rod axially slidable in each bushing and connected to opposite terminals of the line and means for moving the rods into engagement within the tank.

8. For a power line, a switching mechanism comprising an oil-containing tank arranged with its axis parallel to the power line, an insulating bushing axially disposed in each end of the tank, a contact rod axially slidable in each bushing, the two rods being connectable to opposite terminals of the line and being arranged to contact within the tank, and means to slide the rods simultaneously toward or from each other to make or break the line circuit.

9. A switching mechanism comprising an oil-containing tank, one line terminal within the tank, an oscillatory contact device having one part within the tank adapted to make and break contact with the said line terminal as the device oscillates and another part external of the tank adapted to make and break contact with the other line terminal as the device oscillates, and means to cause the internal part of the contact device to act in advance of the external part on the contact-disengaging movement.

10. A switching mechanism comprising an oil-containing tank, one line terminal within the tank, an oscillatory contact device having one part within the tank adapted to make and break contact with the said line terminal as the device oscillates and another part external of the tank adapted to make and break contact with the other line terminal as the device oscillates and means to cause the making of contact by the external part of the contact device to precede that by the internal part and the breaking of contact by the external part to succeed that by the internal part.

11. A switching mechanism comprising an oil-containing tank, one line terminal within the tank, a longitudinally reciprocative conductive rod extending through and slidable in a wall of the tank to bring its inner end into and out of contact with the said line terminal, and a connector between the outer end of said rod and the other line terminal arranged to be operated by the movement of the rod to disengage its line terminal after the disengagement of the inner end of the rod from the first mentioned line terminal.

12. A switching mechanism comprising an oil-containing tank, one line terminal within the tank, a longitudinally reciprocative conductive rod extending through and slidable in a wall of the tank to bring its inner end into and out of contact with the said line terminal, and a movable circuit breaker operative to connect the outer end of said rod with the other line terminal and having a loose connection with the rod for the first part of the outward movement and the latter part of the inward movement of the rod and a fixed connection therewith for the latter part of its outward movement and the first part of its inward movement.

13. The combination in a liquid-immersed circuit interrupter having the main conducting members movable in the liquid, means for bridging the said members for completing a circuit therewith and means for moving the said conducting members away from the bridging means as said means is moved away from said main conducting members.

14. The combination in a liquid-immersed circuit interrupter, of a pair of bushings having the main conducting members thereof movable with respect thereto, a bridging member for said conducting members and means for simultaneously moving said conducting members and the bridging member away from each other.

15. The combination in a liquid-immersed circuit interrupter having more than two independent main current-carrying members arranged for connection in series in a circuit, of means for simultaneously moving each of the members into engagement to complete said circuit.

16. An oil switch for high tension lines comprising an oil-containing tank made of insulating material and surrounded at spaced intervals by circumferential reinforcing bands, two insulative bushings in the wall of the tank, line terminals entering the tank through said bushings and means for sliding the said terminals into engagement within the tank.

17. An oil switch for high tension lines comprising an oil-containing tank made of insulating material and surrounded at spaced intervals by reinforcing bands, insulative bushings in the wall of the tank, line terminals entering the tank through the bushings, and means for actuating said terminals through their bushings to make and break contact with each other within the tank.

18. An oil switch for high tension lines comprising an oil containing tank made of insulating material and surrounded at spaced intervals by reinforcing bands, insulative bushings in the wall of the tank, line terminals entering the tank through the bushings, the said terminals being slidable through their bushings to make and break contact with each other within the tank and means external of the tank for actuating the slidable terminals.

19. A switching mechanism comprising a tank containing an insulating liquid and having its opposite ends formed of insulating material, two alined rods slidable in the ends of the tank and arranged to make contact within the tank, and means in the respective ends of the tank to reciprocate the respective rods to make and break contact.

20. A switching mechanism comprising a tank containing an insulating liquid and having insulating bushings supported in opposed positions thereon, two alined rods slidable in said bushings and arranged to make contact within the tank, and means mounted within said bushings to reciprocate the respective rods to make and break contact.

21. For a power line, a switching mechanism comprising an oil-containing tank arranged with its longitudinal axis parallel to the power line, said oil-containing tank including an insulating bushing axially disposed in each end of the tank and forming the end portions thereof, a contact rod axially slidable in each bushing and connected to opposite terminals of the line, and means movable in each bushing for moving the contact rods into and out of contact making engagement within the tank.

22. For a power line, a switching mechanism comprising an oil-containing tank arranged with its longitudinal axis parallel to the power line, said oil-containing tank including a metal portion forming the central part of the tank and a pair of axially aligned insulating bushings forming the end portions of the tank, a line terminal at the outer end of each of said insulator bushings, a contact rod axially slidable in each bushing and connectable with the line terminal at the end of the bushing, means movable in each bushing for moving said contact rods to open and close the circuit between said line terminals at the ends of the bushings, and an insulator column for supporting and insulating said metal central part of the tank from ground.

23. For a power line, a switching mechanism comprising a liquid-containing tank arranged with its longitudinal axis horizontal, said liquid containing tank including a metal portion forming the central part of the tank and a pair of axially aligned insulator bushings forming the end portions of the tank, line terminals at the opposite ends of said insulator bushings, a contact rod axially slidable in each bushing for opening and closing the circuit between said line terminals, and a vertical insulator column for supporting and insulating said metal central part of the tank from ground.

24. For a power line, a switching mechanism comprising a liquid-containing tank arranged with its longitudinal axis horizontal, said liquid containing tank including a metal portion forming the central part of the tank and a pair of axially aligned insulator bushings forming the end portions of the tank, line terminals at the opposite ends of said insulator bushings, a contact rod axially slidable in each bushing for opening and closing the circuit between said line terminals, a vertical insulator column for supporting and insulating said metal central part of the tank from ground and a vertical insulator column for supporting and insulating each of the opposite ends of said pair of insulator bushings from ground.

25. In a circuit interrupter, an outer container having a body of arc extinguishing fluid retained therein, said outer container having its opposite ends formed by a pair of axially aligned tubular members of insulating material, a line terminal adjacent the outer end of each of said pair of tubular members of insulating material, a contact rod slidable axially in each of said pair of tubular members of insulating material for opening and closing the circuit between said line terminals, means movable in each of said tubular members of insulating material for actuating the contact rod slidable therein, and said slidable contact rods being brought to rest when actuated to closed-circuit position without the impact thereof being transmitted to said tubular members of insulating material.

26. In a circuit interrupter, an outer container having a body of arc extinguishing fluid retained therein, said outer container having its opposite ends formed by a pair of axially aligned tubular members of insulating material, a line terminal adjacent the outer end of each of said pair of tubular members of insulating material, a contact rod slidable axially in each of said pair of tubular members of insulating material for opening and closing the circuit between said line terminals, a spring in each of said tubular members of insulating material for biasing each of said contact rods to open-circuit position, means movable in each of said tubular members of insulating material for actuating the contact rod slidable therein to closed-circuit position against said springs and said slidable contact rods being brought to rest when actuated to closed-circuit position without the impact thereof being transmitted to said tubular members of insulating material.

27. In a circuit interrupter, a container having a body of arc extinguishing fluid retained therein, said container having a central portion of metal and having its ends formed by a pair of axially aligned tubular members of insulating material secured to opposite sides of said central portion of metal, a line terminal at the outer end of each one of said pair of tubular members of insulating material, a contact rod slidable axially in each one of said pair of tubular members of insulating material, and an insulator column for supporting and insulating the metal central portion of said container from ground.

28. For a power line, a switching mechanism comprising an outer container having a body of arc-extinguishing fluid therein, said outer container having its longitudinal axis positioned horizontally and including a metal portion forming the central part of the container and a pair of axially aligned tubular members of insulating material forming the end portions of the container, a line terminal adjacent the outer end of each of said pair of tubular members of insulating material, a contact rod slidable horizontally in each of said pair of tubular members of insulating material for opening and closing the circuit between said line terminals, means movable in each of said tubular members of insulating material for actuating the contact rod slidable therein and said contact rods being brought to rest when actuated to closed-circuit position without the impact thereof being transmitted to said tubular members of insulating material, and a vertical insulator column for supporting and insulating said metal central part of the tank from ground.

29. For a power line, a switching mechanism comprising an outer container having a body of arc-extinguishing fluid therein, said outer container having its longitudinal axis positioned horizontally and including a metal portion forming the central part of the container and a pair of axially aligned tubular members of insulating material forming the end portions of the container, a line terminal adjacent the outer end of each of said pair of tubular members of insulating material, a contact rod slidable horizontally in each of said pair of tubular members of insulating material for opening and closing the circuit between said line terminals, a spring in each of said tubular members of insulating material for biasing each of said contact rods to move to open-circuit position, means movable in each of said tubular members of insulating material for actuating the contact rod slidable therein to closed-circuit position against said springs and said contact rods being brought to rest when actuated to closed-circuit position without the impact thereof being transmitted to said tubular members of insulating material, and a vertical insulator column for supporting and insulating said metal central part of the tank from ground.

30. The combination in a liquid-immersed circuit interrupter, of a tank for the liquid having its opposite ends formed of insulating material, more than two independent main current-carrying members arranged for connection in series in the circuit, said current carrying members including two aligned rods slidable in the ends of the tank, and means in the respective ends of the tank for simultaneously moving each of said aligned rods to make and break contact.

31. The combination in a liquid-immersed circuit interrupter, of a tank for the liquid having its opposite ends formed of insulating material, a line terminal at each of said opposite ends of the tank, more than two movable current-carrying members arranged for connection in series between said line terminals, said current-carrying members including at least two aligned rods slidable in said ends of the tank of insulating material, and means in the respective ends of the tank for simultaneously moving each of said aligned rods to open the circuit between said line terminals at a plurality of points.

32. The combination in a liquid-immersed circuit interrupter, of a tank for the liquid having its opposite ends formed of insulating material, a line terminal at each of said opposite ends of the tank, more than two movable current-carrying members arranged for connection in series between said line terminals, said current-carrying members including at least two aligned rods slidable in said ends of the tank of insulating material, means for simultaneously moving each of said current-carrying members to open the circuit between said line terminals at a plurality of points, and an insulator column for supporting and insulating said tank from ground.

33. The combination in a liquid-immersed circuit interrupter, of an outer tank for the liquid including tubular means of insulating material, more than two movable main current-carrying members arranged for connection in series in the circuit for opening and closing the circuit at a plurality of points, means for moving each of said current-carrying members to simultaneously open the circuit at a plurality of points, and some of said current carrying members being movable within said tubular means of insulating material.

34. The combination in a liquid-immersed circuit interrupter, of an outer tank for the liquid including tubular means of insulating material, more than two movable main current-carrying members arranged for connection in series in the circuit for opening and closing the circuit at a plurality of points, means for moving each of said current-carrying members to simultaneously open the circuit at a plurality of points, and some of said current carrying members being movable within said tubular means of insulating material, and an insulator column for supporting and insulating said outer tank from ground.

35. The combination in a liquid-immersed circuit interrupter, of an outer tank for the liquid including tubular means of insulating material, more than two movable main current-carrying members arranged for connection in series in the circuit for opening and closing the circuit at a plurality of points, some of said current-carrying members being movable within said tubular means of insulating material, means within said tubular means of insulating material for biasing the current-carrying members movable therewithin to open-circuit position, and means for causing all of said current-carrying members to move to simultaneously open the circuit at a plurality of points.

36. A switching mechanism for a power line comprising a circuit breaker having a fluid-containing tank, said tank including an insulator bushing, a pair of separable contacts in said tank for opening and closing the circuit under load, means for connecting one of said contacts in the tank to the power line including a pair of separable contacts outside of said tank and a conductor extending into said insulator bushing, an actuating member movable in said insulator bushing and said actuating member being connected to actuate one of said separable contacts outside of the tank to connect and disconnect said circuit breaker and the power line.

37. A switching mechanism for a power line comprising a circuit breaker having a container including a tubular member of insulating material, a pair of contact members in the container for opening and closing the circuit under load, one of said contact members being movable in said tubular member of insulating material, means for connecting one of said contacts in the container to the power line including a pair of contacts of a disconnecting switch outside of said container and a conductor extending therefrom into the end of said tubular member of insulating material, actuating means movable in said tubular member of insulating material, and means mechanically connecting said actuating means to move said disconnecting switch to open and close the circuit between the power line and the circuit breaker.

38. A switching mechanism for a power line comprising a container having a body of insulating fluid retained therein, said container having one end formed by a tubular member of insulating material, a contact within the container and connectable to one terminal of the power line, a second contact movable in said tubular member of insulating material into and out of engagement with the first said contact, disconnecting switch means outside of said container and electrically connected in series with said contacts, said disconnecting switch means being connected at one end in circuit with said second contact at a point adjacent to the outer end of said tubular member of insulating material, and means for actuating said disconnecting switch means including an operating member through which force is transmitted to said disconnecting switch means, said operating member being movable in said tubular member of insulating material.

39. A switching mechanism for a power line comprising a circuit breaker having a container including a tubular member of insulating material, a pair of contact members in the container for opening and closing the circuit under load, one of said contact members being movable in said tubular member of insulating material, means for connecting one of said contacts in the container to the power line including a pair of contacts of a disconnecting switch outside of said container and a conductor extending therefrom into the end of said tubular member of insulating material, actuating means movable in said tubular member of insulating material, and means mechanically connecting said actuating means to move said disconnecting switch to open and close the circuit between the power line and the circuit breaker and means for causing said disconnecting switch to be actuated to open and close the circuit to the circuit breaker only when the circuit breaker is in open-circuit position.

40. A switching mechanism for a power line comprising a circuit breaker having enclosing means including a pair of tubular members of insulating material, a terminal adjacent one end of each of said tubular members of insulating material, a plurality of contact members within said enclosing means for opening and closing the circuit between said terminals under load, said plurality of contact members including a contact member movable in each of said pair of tubular members of insulating material, a pair of disconnecting switch means outside of said enclosing means and electrically connected in series with the contact members within the enclosing means, each of said disconnecting switch means having one side thereof connected to one of said terminals for disconnecting each terminal of the circuit breaker from the circuit, and means for actuating said disconnecting switch means including an operating member movable in each of said tubular members of insulating material.

41. For a power line, a switching mechanism comprising a liquid-containing tank arranged with its longitudinal axis horizontal, said liquid containing tank including a metal portion forming the central part of the tank and a pair of axially aligned insulator bushings forming the end portions of the tank, line terminals at the opposite ends of said insulator bushings, a contact rod axially slidable in each bushing for opening and closing the circuit between said line terminals, a pair of disconnecting switches outside of said liquid-containing tank and electrically connected in series with said contact rods in the tank, said disconnecting switches each being connected to one of said terminals at the ends of the insulator bushings for disconnecting both terminals from the line, and means for actuating said disconnecting switches including an operating member movable in each of said insulator bushings.

WESTINGHOUSE ELECTRIC &
MANUFACTURING COMPANY,
*Assignee of Frank G. Baum, Deceased.*
W. S. RUGG,
*Vice President.*